H. A. LUTTGENS.
APPARATUS FOR REGULATING THE SPEED OF ENGINES.
No. 8,447. Patented Oct. 21, 1851.
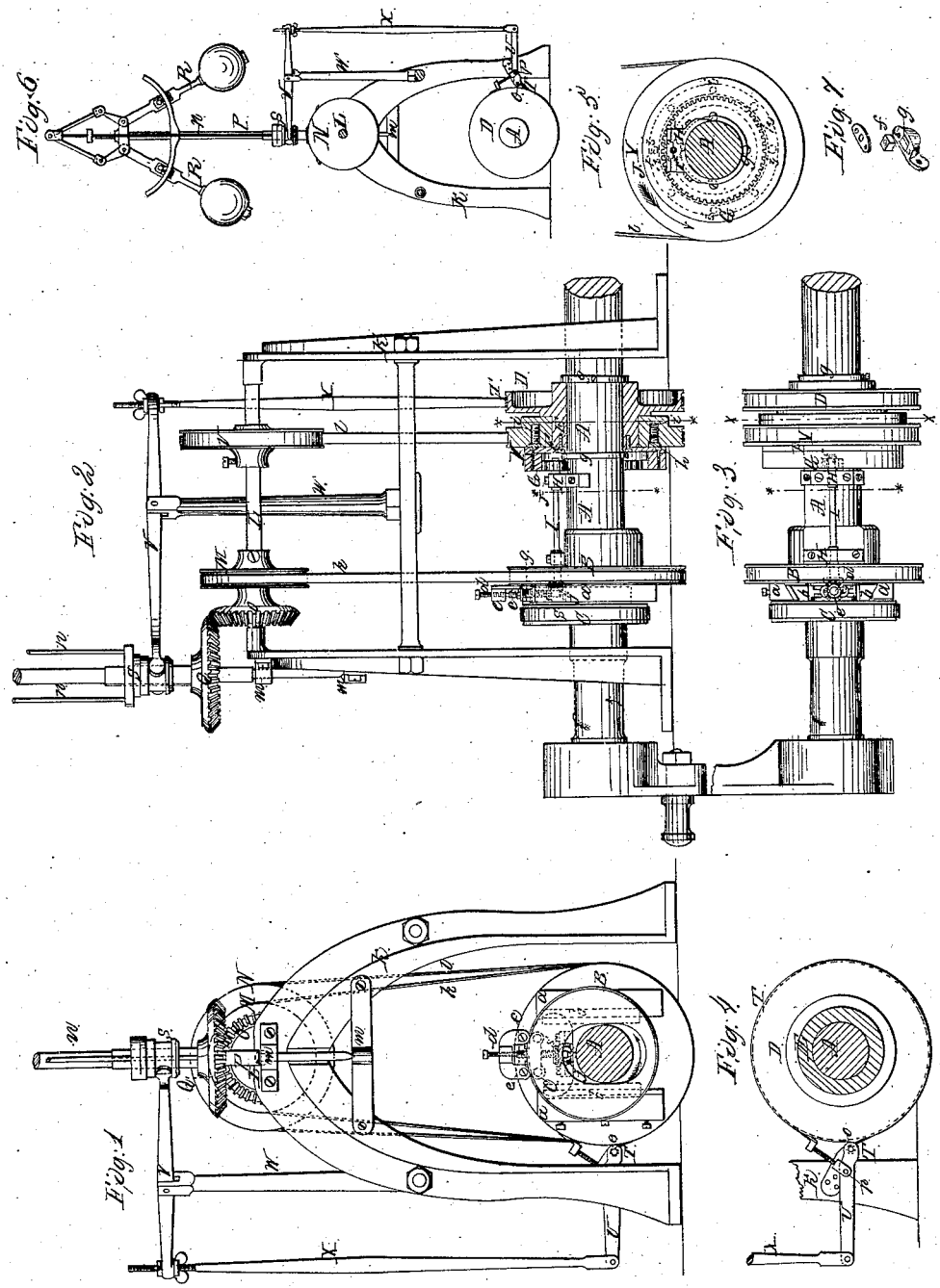

UNITED STATES PATENT OFFICE.

H. A. LUTTGENS, OF NEW YORK, N. Y.

APPARATUS FOR REGULATING THE SPEED OF ENGINES.

Specification of Letters Patent No. 8,447, dated October 21, 1851.

*To all whom it may concern:*

Be it known that I, H. A. LUTTGENS, of the city, county, and State of New York, have invented certain new and useful Improvements in apparatus to be connected to the governor of Steam-Engines for the purpose of regulating and controlling the speed of the engines by the cut-off; and I do hereby declare that the following is a full, clear, and exact description of the same, reference being had to the accompanying drawings, forming part of this specification, in which—

Figure 1, is a side elevation of the apparatus. Fig. 2, is a front elevation of the same. Fig. 3, represents the crank shaft of the engine, with as much of the apparatus as it carries. Fig. 4, is a transverse section of the shaft and part of the apparatus taken in the line *x*, *x*, in Figs. 2 and 3; Fig. 5 is another transverse section taken in the line * * in Figs. 2, and 3. Fig. 6 is a view on a smaller scale than the before mentioned figures, showing the manner in which the governor acts upon the apparatus. Fig. 7, exhibits the manner in which the nut by which the cut off eccentric is adjusted, is secured.

Similar letters of reference indicate corresponding parts in each of the several figures.

My invention consists in a movable cut-off eccentric whose stroke is controlled by mechanism which depends for its action upon a pulley, brake, wheel, and spur-wheel, hung upon the same shaft with it (the eccentric); the brake wheel and spur wheel are secured toegther and fitted loosely on the shaft so as to turn upon it, but are confined lengthwise; the pulley is fitted outside the boss or hub of the brake-wheel or spur-wheel, and is made to drive the brake-wheel and spur-wheel by friction, being itself driven by a band in the same direction as, but at a greater speed than the shaft; the brake-wheel is encircled by a friction band or strap which is controlled by the governor so as to produce a greater or less amount of friction upon it.

The mechanism which actuates the eccentric consists of a small shaft or spindle which is hung parallel to the main shaft in bearings secured upon its periphery; on one end of the spindle is a pinion which gears in the spur-wheel, and on the other end, a bevel wheel which gears into another bevel wheel fast upon a screw, by turning which screw the throw of the eccentric is altered. The apparatus is so adjusted, that when the engine is working at its proper speed, the governor shall produce just so much friction of the brake strap on the brake-wheel, as will balance the friction of the pulley on the spur-wheel, and cause the spur-wheel to be driven at the same speed as the shaft, and make the eccentric stationary; but that as soon as the speed increases or decreases, it shall cause the governor to exert a greater or less amount of friction on the brake-wheel than the pulley exerts upon the toothed wheel, and thus cause the spur wheel to revolve at a greater or less speed than the shaft, when in either case it operates on the pinion and gives revolution to the small shaft or spindle, and the bevel wheels operating on the screw of the eccentric alter its throw to cut off the steam earlier or later as may be required.

To enable others skilled in the art, to make and use my invention, I will proceed to describe its construction and operation.

A, is the crank shaft of the engine.

B, is a pulley keyed firmly on the crank shaft for the purpose of driving the governor and apparatus connected; it is provided on one side with a pair of dovetailed guides *a, a*, which are either cast with, or secured firmly to it.

C, is the cut-off eccentric which has dovetailed slides *b, b*, cast upon or secured to its back, fitting between the guides *a, a*, on the pulley B; it has an opening in it for the shaft to pass through, which is of such form (see Fig. 1,) as to allow its degree of eccentricity to be altered.

C, is the screw for altering the throw of the eccentric one end of it rests in a female center on the pulley B, and the other end, against the point of a center screw *d*, which fits in a nut *e*, secured to the pulley, it is held perpendicular to the axis of the shaft and radial to it, and is prevented from moving endwise; it carries a bevel pinion S, and passes through a nut *f*, which is placed in a small box *g*, (constructed as shown in Fig. 7,) secured firmly to the eccentric; this nut is fitted in the box to admit of its being easily replaced if it should wear out. It will be easily understood that if the screw C, is turned round, being confined endwise, it will cause the nut *f*, to move along it and change the position of the eccentric C.

D, is the brake wheel which has a deep boss or hub E (see Fig. 2) and which is bored to fit easily on the shaft, F, is a disk of metal secured to the brake-wheel by screw bolts; and G, is a ring toothed inside and secured to the disk F, being equivalent to a spur-wheel; the brake-wheel and spur-wheel are secured against moving endwise on the shaft by rings $g$, $g$, which are secured upon the shaft by set screws.

Y, is the pulley which gives motion to the spur-wheel or toothed ring G; it is of the same diameter as the pulley B, and is fitted on the hub E, of the brake-wheel, which is turned to receive it, and has a groove or recess turned in the face which is next the disk F, to receive a ring $h$ (see Fig. 2) of brass or other suitable metal which is faced true on its outside and has a suitable number of spiral springs $i$, $i$, applied to its back side to force it out against the disk F, which is also faced true.

H, H, are a pair of small bearing boxes secured, one on the periphery of the shaft A, and one on the hub of the pulley B, for the purpose of carrying the small shaft or spindle I, on which are the pinion J, gearing into the toothed ring G, and the bevel wheel $j$, gearing into the bevel wheel S, on the adjusting screw C, of the eccentric.

K, K, are two standards one of which is intended to be secured to the framing of the engine, L is a small shaft hung in bearings in the standards K, K, it carries a pulley M, through which it receives motion by a band $k$, from the pulley B on the main shaft, and another pulley N, of greater diameter than M, which communicates motion by means of a band $l$, to the pulley Y; it also carries a bevel wheel O, for driving the governor.

P, is the main spindle of the governor which is hung vertically in suitable bearings $m$, $m$, on one of the standards K; it carries the bevel wheel Q gearing with and driven by O.

R, R, are the weighted arms of the governor, and $n$, $n$, small rods through which they operate on the slide socket S, raising it as their speed and centrifugal force increase, and depressing it as they decrease, the governor it driven at the same speed as the crank shaft the difference between the diameters of the pulleys B, M being compensated for by the difference between the bevel wheels O, Q.

T, is the brake-strap which is made of light spring steel, hammered straight or only slightly curved, so that when it encircles the wheel, it has always a tendency to free itself from the wheel unless such tendency is overcome by other means, one end of it is attached to a stationary pin $o$, which is secured in one of the standards K, the said pin $o$, forming the fulcrum of the lever U, to which at $p$, a short distance from its fulcrum the opposite end of the brake-strap is connected.

V, is a lever whose fulcrum is in the top of a standard pillar W, secured to one of the stays placed between the standards K, K, one arm is forked at its end to embrace the governor slide socket S, and the other is connected by a rod X, to the end of the brake-lever U. The slightest motion of the slide socket up or down caused by the spread of the governor varying, will cause the lever V, to act on the brake-lever U, and lighten or loosen the brake-strap upon the wheel, and cause it to produce more or less friction upon it.

The operation of the apparatus is as follows: The first thing to be observed is that as the diameter of the pulley N, exceeds that of the pulley M, and the diameters of the pulley B, and Y, are the same, Y, being driven by the larger pulley must revolve at a quicker speed than B, and therefore must either turn upon or around the boss E, or by the friction of the ring $h$, on the disk F, cause the said disk together with the toothed ring G and brake-wheel D, to turn around or upon the shaft.

When no friction or less friction than that of the ring $h$, on the disk F, is produced on the brake-wheel (the shaft and pulleys always revolving in the direction indicated by arrows in the drawing) the pulley Y, drives the toothed ring or spur-wheel G, on in advance of the crank shaft, and in so doing it causes it to drive the pinion J, and give revolution to the small shaft or spindle I, and bevel-wheel $j$, in such a direction as to turn the screw C, in the proper direction to decrease the eccentricity or throw of the eccentric; but when more friction is produced on the brake-wheel than that produced by the ring $h$, on the disk, the toothed ring or spur-wheel G, is retarded and the shaft moves on in advance of it, the pinion J, spindle I, and bevel-wheel $j$, then revolve in the opposite direction to that last described, causing the screw C, to turn in the opposite direction and increase the eccentricity or throw of the eccentric, which is so connected to the cut off, and so caused to operate it, that, the greater the eccentricity or throw of the eccentric, the quicker or earlier the steam is cut off.

The eccentric is set so that it will cut off the steam, to give the engine the required velocity when the steam is at the ordinary pressure and the usual amount of work is on the engine, and the pressure of the brake-strap is so adjusted as to cause just so much friction as will keep the brake-wheel and toothed ring or spur-wheel G, stationary upon, or revolving at the same velocity as the crank shaft, when the spindle I, and consequently the screw $c$, and the eccentric, remain stationary, but, as soon as the pressure of the steam rises, or any work is taken off the engine, and its velocity increased, the velocity of the governor, and the centrifugal force of the balls will be increased and will raise the slide socket S, and force down the rod X, and brake-lever U, tightening the brake-strap, and increasing its friction on the wheel, thereby retarding the toothed ring or spur-wheel G, and giving motion to the pinion J, and spindle I, so as to increase the throw of the eccentric, if, on the contrary the pressure of the steam falls, or the work on the engine is increased, and the speed thereby decreased, the centrifugal force of the governor balls will diminish and lower the slide socket S, raising the rod X, and brake-lever U, and loosening the strap, thereby reducing the friction on the wheel, and allowing the toothed ring or spur-wheel to move on in advance of the crank shaft, and to give motion to the pinion J, and spindle I, so as to lessen the throw of the eccentric, thus, the throw of the eccentric and the operation of the cut off is governed by the pressure of the steam and the amount of work upon the engine, and the engine is caused to work with a greater uniformity of speed than can possibly be obtained under a varying pressure, or where the amount of work on the engine varies, when the engine is governed by a throttle valve.

The governor employed should have its balls very heavy, and should altogether be so constructed as to give the greatest increase of pressure on the brake in proportion to the increase of speed.

The apparatus is capable of considerable modification without changing its character, as for instance instead of a pair of bevel wheels s, j, upon the screw C, and spindle I, the screw may be provided with a worm wheel, and the spindle with an endless screw gearing into it; the teeth of the ring G, may be outside like those of a common spur wheel; all the parts which are on the crank-shaft may be placed on an independent shaft hung parallel to the crank shaft and driven at the same speed, these changes are of no importance and would not interfere with the principle of the invention.

Two engines and two eccentrics may be governed at the same time without duplicating the pulley Y, brake-wheel, or brake strap; a wheel G, being placed on the opposite side of the brake-wheel will communicate motion by similar mechanism to the other eccentric; the spindle I if the second eccentric, being carried through a hole bored through the hub of the fly wheel.

I have throughout described steam as the motive agent, but the apparatus is equally applicable to an engine impelled by any expansible gas.

What I claim as my invention and desire to secure by Letters Patent, is—

Governing the throw of the variable cut off eccentric C, for the purpose of operating the cut off so as to regulate or equalize the speed and power of the engine, by means of the balance of or difference between the constant friction produced by the revolution of a pulley Y, which is hung loosely upon the same shaft with the said eccentric and driven at a speed which always bears the same proportion to but is greater than the speed of the shaft, and the variable friction of a brake strap T, upon a wheel D, which is also hung loosely upon the same shaft and which receives or is acted upon by the aforesaid constant friction of the pulley, the tightness of the brake strap and the friction produced by it being controlled by a common steam engine governor, the whole operating substantially as described, the said balance or difference of friction producing either an uniformity or difference between the speed of the shaft and of the wheel D, and the said difference in speed causing motion to be given to any train of mechanism substantially such as is described in communication with the eccentric.

H. A. LUTTGENS.

Witnesses:
O. D. MUNN,
S. H. WALES.